US009344984B2

(12) United States Patent
Torres et al.

(10) Patent No.: US 9,344,984 B2
(45) Date of Patent: May 17, 2016

(54) APPARATUS AND METHOD FOR DATA MESSAGE COMMUNICATION

(71) Applicant: Google Technology Holdings LLC, Mountain View, CA (US)

(72) Inventors: Stephane Torres, Portet-sur-Garonne (FR); Gregory M. Agami, Arlington Heights, IL (US); Christophe Durand, Tournefeuille (FR); Yun H. Kim, Bartlett, IL (US); Pierre Muratory, Tournefeuille (FR)

(73) Assignee: Google Technology Holdings LLC, Mountain View, CA (US)

( * ) Notice: Subject to any disclaimer, the term of this patent is extended or adjusted under 35 U.S.C. 154(b) by 447 days.

(21) Appl. No.: 13/784,870

(22) Filed: Mar. 5, 2013

(65) Prior Publication Data
US 2013/0235797 A1    Sep. 12, 2013

(30) Foreign Application Priority Data

Mar. 7, 2012 (EP) .................................... 12290081

(51) Int. Cl.
*H04W 56/00* (2009.01)
*H04W 74/08* (2009.01)
*H04W 74/00* (2009.01)

(52) U.S. Cl.
CPC ........ *H04W 56/004* (2013.01); *H04W 56/0045* (2013.01); *H04W 74/008* (2013.01)

(58) Field of Classification Search
CPC ............ H04W 74/008; H04W 56/004; H04W 56/0045; H04W 74/004; H04W 74/0833; H04J 11/00; H04J 13/22; H04J 13/0062; H04L 5/0007; H04L 1/0003; H04L 1/0625; H04L 5/0023; H04L 5/0044; H04L 5/0048; H04L 5/0091; H04L 27/2615; H04L 27/2636; H04L 5/0058; H04L 27/2626; H04B 7/0671; H04B 7/0602; H04B 7/2621

See application file for complete search history.

(56) References Cited

U.S. PATENT DOCUMENTS

| | | | | |
|---|---|---|---|---|
| 2008/0233960 | A1* | 9/2008 | Kangude | ............... H04L 5/0007 455/436 |
| 2008/0316961 | A1 | 12/2008 | Bertrand et al. | |
| 2009/0073944 | A1* | 3/2009 | Jiang | ........................ H04J 11/00 370/338 |
| 2010/0002671 | A1* | 1/2010 | Iwai | .................... H04J 13/0074 370/342 |
| 2010/0099423 | A1* | 4/2010 | Ogawa | ................ H04J 13/0062 455/450 |
| 2010/0172299 | A1* | 7/2010 | Fischer | ............. H04W 74/0866 370/328 |
| 2012/0113939 | A1* | 5/2012 | Kim | .................... H04W 74/006 370/329 |
| 2012/0294185 | A1* | 11/2012 | Queseth | .............. H04W 74/008 370/252 |

* cited by examiner

*Primary Examiner* — Yee Lam
(74) *Attorney, Agent, or Firm* — Lerner, David, Littenberg, Krumholz & Mentlik, LLP

(57) ABSTRACT

A method and user device are for communicating data from the user device by transmitting a synchronizing preamble having no timing advance, the synchronizing preamble comprising a base sequence that has been cyclically shifted by N shift index durations. The user device receives from a network station a response that indicates that a preamble was received from the user device having the base sequence cyclically shifted by N−1 shift index durations. The user device determines, based at least partially on the response, that corrective action is appropriate. The user device performs one of transmitting a modified form of synchronizing preamble, transmitting the data as a data message having a timing advance, and barring further attempts to transmit the data to the network station for a defined duration.

20 Claims, 7 Drawing Sheets

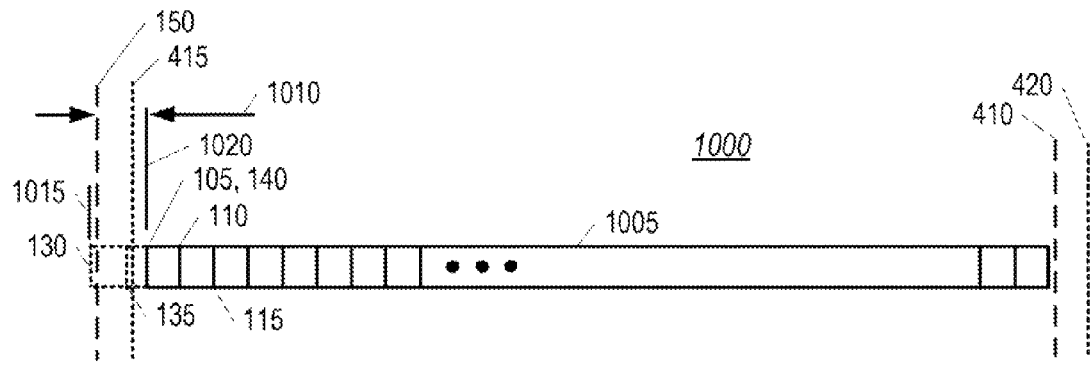

1200

1205

DETERMINE THE DURATION FROM ONE OR MORE OF:
 THE INDICATION THAT THE SYNCHRONIZING PREAMBLE WAS RECEIVED WITH N-1 SHIFT INDEX DURATIONS,
 A TIMING ADVANCE VALUE THAT IS PROVIDED IN A RESPONSE FROM THE NETWORK STATION, AND
 A PROPAGATION DELAY DETERMINED BY THE USER DEVICE BASED ON A PHYSICAL LOCATION OF THE USER DEVICE DETERMINED BY THE USER DEVICE

DETERMINE THE TIMING ADVANCE FROM ONE OR MORE OF:
 THE INDICATION THAT THE SYNCHRONIZING PREAMBLE WAS RECEIVED WITH N-1 SHIFT INDEX DURATIONS,
 A TIMING ADVANCE VALUE THAT IS PROVIDED IN A RESPONSE FROM THE NETWORK STATION, AND
 A PROPAGATION DELAY DETERMINED BY THE USER DEVICE BASED ON A PHYSICAL LOCATION OF THE USER DEVICE DETERMINED BY THE USER DEVICE

*FIG. 13*

APPARATUS AND METHOD FOR DATA MESSAGE COMMUNICATION

FIELD OF THE INVENTION

The present invention relates generally to communications from a user device to a network station in a communication system, and more specifically to synchronization of the user device to the network station.

BACKGROUND

In electronic communication systems two devices generally become synchronized in order for the devices to successfully communicate information (data) with each other. In communication systems that are in common use at this time, synchronism must occur at a symbol clock rate as well as at higher levels, such as word and/or frame clock rates, before data is communicated.

Synchronizing preambles are typically used to attain the synchronization required. The preambles used in current wide area radio communication systems are kept as short as practical in order to attain reliable synchronism at a designed maximum separation distance between a user device and a network station, thereby providing a high data throughput in the system. In certain cellular communication systems, when a user device is within range of a network station of a cell, and the user device is ready to establish contact with the network station for the purpose of sending a data message to the network station, the user device sends a synchronizing preamble to the network station. The synchronizing preamble in 3GPP LTE ($3^{rd}$ Generation Partnership Project, Long-Term Evolution) communication systems comprises one of a quantity of different synchronizing sequences of data symbols. The data symbols represent complex values. The quantity of different synchronizing preambles has to be large enough to achieve an acceptably low probability that a network station receives the same synchronizing preamble from two user devices that are operating near the network station. The plurality of synchronizing sequences are derived from a much smaller plurality of carefully chosen "root" or "base" symbol sequences that have been selected because they have characteristics that optimize the synchronization process. The characteristics are not affected by cyclical shifting of the base sequence symbols.

The quantity of different sequences are derived by cyclically shifting the symbols of the base sequences by a multiple of a defined quantity of the symbols. The duration of the defined quantity of the symbols is approximately equal to the propagation delay that occurs at a maximum range at which the synchronizing preamble will be reliably received under normal circumstances. When the user device transmits the synchronizing preamble from beyond the maximum range, it will be appreciated that the signal strength of the synchronizing preamble may be sufficient to allow enough symbols to be correctly received so that the network station can achieve synchronization. This circumstance arises because of the well known vagaries of radio wave propagation. Under this circumstance of being beyond the maximum range and yet having sufficient signal strength to attain synchronism, the propagation delay will likely cause the network station to recover the synchronizing preamble as if it were a synchronizing preamble that was derived from the base sequence with one less multiple of the defined quantity of symbols than was used to actually generate the synchronizing sequence that was transmitted, and the synchronization of the associated data message may fail even though there is sufficient signal strength for the synchronization to succeed.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description, which describes exemplary embodiments of implementable concepts that include the invention. The description is meant to be taken in conjunction with the accompanying drawings in which:

FIGS. 6-9 are flow charts showing steps performed by a user device such as described with reference to FIG. 5.

FIG. 10 shows a timing diagram that illustrates a synchronizing preamble that may be transmitted by a user device when the user device attempts to communicate data to a network station, in accordance with certain embodiments.

FIGS. 11-13 are flow charts showing steps performed by a user device such as described with reference to FIG. 5.

Figure 1:
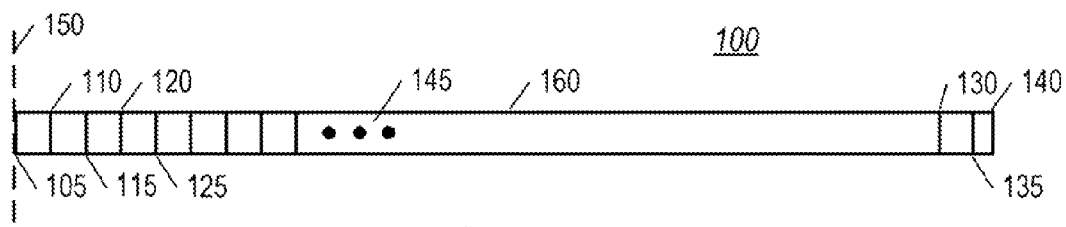
FIGS. 1 and 2 are timing diagrams that show a synchronizing preamble that may be transmitted by a user device when the user device attempts to communicate data to a network station, in accordance with certain embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In the description below, like reference numerals are used to describe the same, similar or corresponding parts in the several views of the drawings.

Embodiments described herein generally relate to conserving communication system resources by improving the probability of synchronizing a user device to a network station or barring the user device from further attempts to communicate with the network station.

Referring now to FIG. 1, a timing diagram 100 shows a synchronizing preamble 160 that may be transmitted by a user device when the user device attempts to communicate data to a network station, in accordance with certain embodiments. The user device may operate in a system in which the user device and the network station are synchronized to a system clock that defines periodic times at which the user device may be expected to send synchronizing preambles. This is identified in FIG. 1 as system preamble time 150. The user device initiates a synchronizing preamble, which comprises a sequence of symbols that starts at the system preamble time 150 and ends after a defined synchronizing duration at time 140. Each symbol may comprise one or more bits, or higher level modulation symbols, including symbols that may represent complex values. The synchronizing preamble 160 comprises a sequence of such symbols (not explicitly shown in FIG. 1) which is designed to provide characteristics of the synchronizing preamble that improve the probability that the synchronizing preamble is recognized by the network station in the presence of noise while reducing the probability of falsely being recognized as a different synchronizing preamble. The synchronizing preamble 160 is one of a plurality of synchronizing preambles of common defined length that are defined for use by differing user devices, so that a plurality of user devices can simultaneously communicate to network stations that are near one another and be distinguishable by the synchronizing preamble each user device is using. In some embodiments, the preambles might be assigned, while in others they might be randomly chosen by each user device. In order to define the designed plurality of synchronizing preambles, a technique is used in which cyclical shifts of "root" or "base" sequences are used. The cyclical shifts each comprise a multiple of a defined quantity of the symbols, and are identified herein by shift indices. The defined quantity has a defined duration determined by the symbol rate being used in the synchronizing preambles, which is herein termed the shift index duration. The shift index duration may be chosen to be approximately equivalent to the RF propagation delay incurred by signals using a particular protocol that are transmitted between a type of user device and a particular network station when the user device is at range that is deemed to be a nominal maximum range of operation for the user device and the network station.

For one example used in this document, in certain 3GPP LTE embodiments that use synchronizing preambles (PRACH) as described at least within 3GPP TS 36.211 V10.1.0, for a certain class of user devices operating under certain circumstances with a particular network station, the synchronizing preambles are formed from Zadoff-Chu sequences that are 839 symbols long and for which the cyclical shift is defined to be 32 symbols. Thus, each cyclical shift has a shift index duration equivalent to the duration of 32 symbols. One base sequence therefore provides 26 different cyclical shifts, with 7 symbols "left over". In this example, 64 different synchronizing preambles are provided by using 26 different cyclical shifts of two different base sequences and using 12 cyclical shifts of a third base sequence. The presence of "left over" symbols provides certain benefits in some embodiments, but is not needed in all embodiments to provide some of the benefits. This will be described further, below. In 3GPP LTE systems, the user device receives a value that identifies how many full cyclical shifts are to be obtained from the 839 symbol Zadoff-Chu sequences for subsequent preamble transmissions. From that value, the user device can calculate the shift index duration.

The synchronizing preamble 160 represents an unshifted base sequence. Several of the shift index durations are explicitly shown in FIG. 1, with the remainder implied by the ellipsis 145. A shift index is identified in FIG. 1 at the beginning of each shift index duration. The shift index is used to identify the shift index duration that follows. Shift index 105 is shift index number 0 (SI0). Shift index 110 is SI1. Shift index 115 is SI2. Shift index 120 is SI3. Shift index 125 is SI4. Shift index 130 is the last shift index. In the example given above this would be SI25. The end of the last shift index duration is identified at position 135, and the end of the synchronizing preamble is identified as position 140. The duration between the end of the last shift index duration and the end of the preamble is the duration of the "left over" symbols, if there are any. In the example described above, the duration is the duration of 7 symbols.

Figure 2:
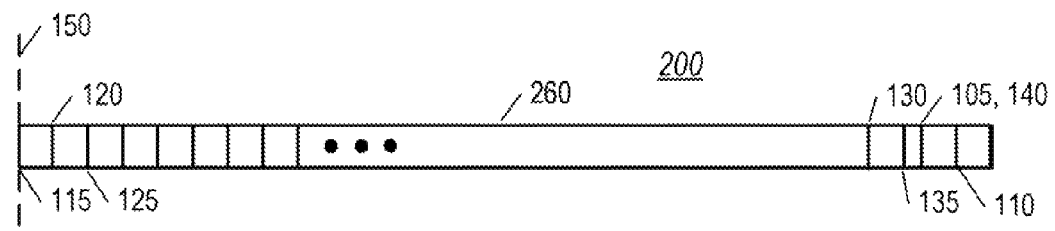

Referring to FIG. 2, a timing diagram 200 shows another synchronizing preamble 260 that may be transmitted by a user device when the user device attempts to communicate data to a network station, in accordance with certain embodiments. The synchronizing preamble 260 uses the same base sequence as the synchronizing preamble 160, but is cyclically shifted such that the synchronizing preamble 260 starts with SI2 115. The positions of the other shift indices are indicated using the same reference numbers used in FIG. 1. It can be seen that the last shift index 130 and the left over symbols starting at position 135 are followed by SI0 105. The position of SI0 105 is equivalent to the cyclically shifted end 140 of the unshifted base sequence 160. The cyclically shifted synchronizing preamble 260 ends with the shift index duration that starts with SI1 110. Herein, the quantity of cyclical shifting of shift index durations is identified as N. By this definition, N for the synchronizing preamble 260 is 2 and N for the synchronizing preamble 160 is 0.

Figure 3:
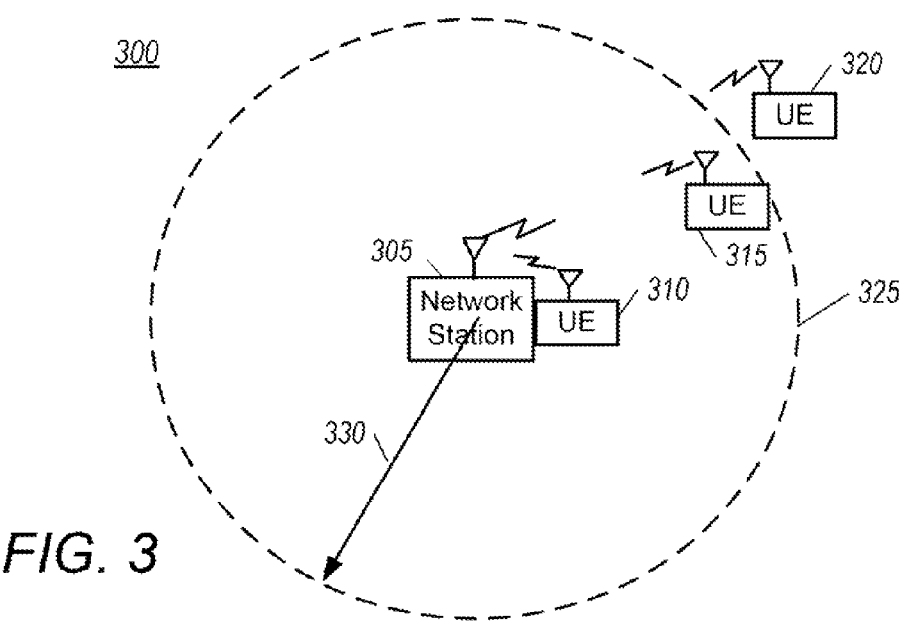
FIG. 3 is a diagram of an idealized portion of a communication system, in accordance with certain embodiments.

Referring to FIG. 3, a diagram of an idealized portion 300 of a communication system is shown, in accordance with certain embodiments. The portion 300 shows a network station 305, and a user device (also referred to as user equipment, or UE) located at three positions 310, 315, and 320 relative to the network station 305. The diagram is idealized at least because no nearby network stations are shown and because a nominal maximum circular range 330 is shown. When the user device determines that the user device is ready to transmit data to the network station 305 and the user device and network station are not synchronized to each other, the user device sends a first synchronizing preamble, which may be of the type described above with reference to FIGS. 1 and 2, i.e., one that comprises a base sequence that has been cyclically shifted by N shift index durations. The user device initiates the synchronizing preamble at the system preamble time 150 (FIG. 1). The start of the synchronizing preamble does not, however, arrive at the network station at the system preamble time 150, but is delayed by a duration determined by RF propagation delay. The network station 305 uses a synchronizing process to identify the synchronizing preambles that are transmitted by user devices at the system preamble time, and delayed by propagation delays. For certain embodiments this identification is done by a correlation process. In embodiments in which the user device randomly selects one of a plurality of synchronizing preambles, the synchronizing process determines a maximum correlation value for any of the plurality of synchronizing preambles, at various propagation delays. In embodiments in which the user device is assigned a particular cyclical shift by the network station, other communication system process, a particular plurality of such synchronizing preambles may have to accommodate for the case when a plurality of user devices are simultaneously attempting to communicate with one network station, so in these embodiments, the synchronization process is designed to accommodate the particular plurality of synchronizing preambles, at various propagation delays Referring to FIG. 4, a timing diagram showing the reception of a synchronizing preamble at a network station when the synchronizing preamble is received from a user device at differing ranges is shown, in accordance with certain embodiments. The synchronizing preamble identification process is designed to detect the defined plurality of synchronizing preambles over a range of propagation delays. The range of delays and length of the synchronizing preambles is illustrated by the lines 440, 445 of FIG. 4. The start of the synchronizing preamble may be detected at any symbol within a duration defined by the system preamble time 150 and a later time 415. In some embodiments, this defined duration is one shift index duration. In the particular example being used herein, the start time of the synchronizing preamble is identified as one of the 32 samples that occur in one shift index duration starting at the system preamble time. The synchronizing process, which in some examples is a correlation process, identifies the start time of the synchronizing preamble and the amount of cyclical shift of the preamble by determining the symbol at which a peak correlation occurs. An example of synchronizing to the user device when the user device is in close proximity 310 (FIG. 3) to the network station 305 (FIG. 3) is shown by received synchronizing preamble 450, which is the same as synchronizing preamble 260 of FIG. 2, but delayed by a propagation delay 426. The synchronizing process identifies the start time 115 (and by deduction the propagation delay 426) and the number of shift index durations, N=2, of the synchronizing preamble 450. When the network station 305 makes this identification, the network station 305 sends a message to the user device that identifies N (for verification) and the value of the propagation delay 426 as a transmission timing advance value. The transmission timing advance value (also referred to as simply the timing advance value or timing advance) is used by the user device to the start of user device transmissions with reference to defined system transmission times. Using the timing advance by the user device avoids having to use uniquely adjusted system timings for each user device by the network station, which may be many user devices. While receiving such data messages, techniques well known in the art are used to attempt to maintain the correct timing advance in the user device as the user device moves while communicating with the network station 305 (FIG. 3). If these techniques fail, the user device may then transmit another synchronizing preamble to re-identify an appropriate timing advance.

Figure 4:
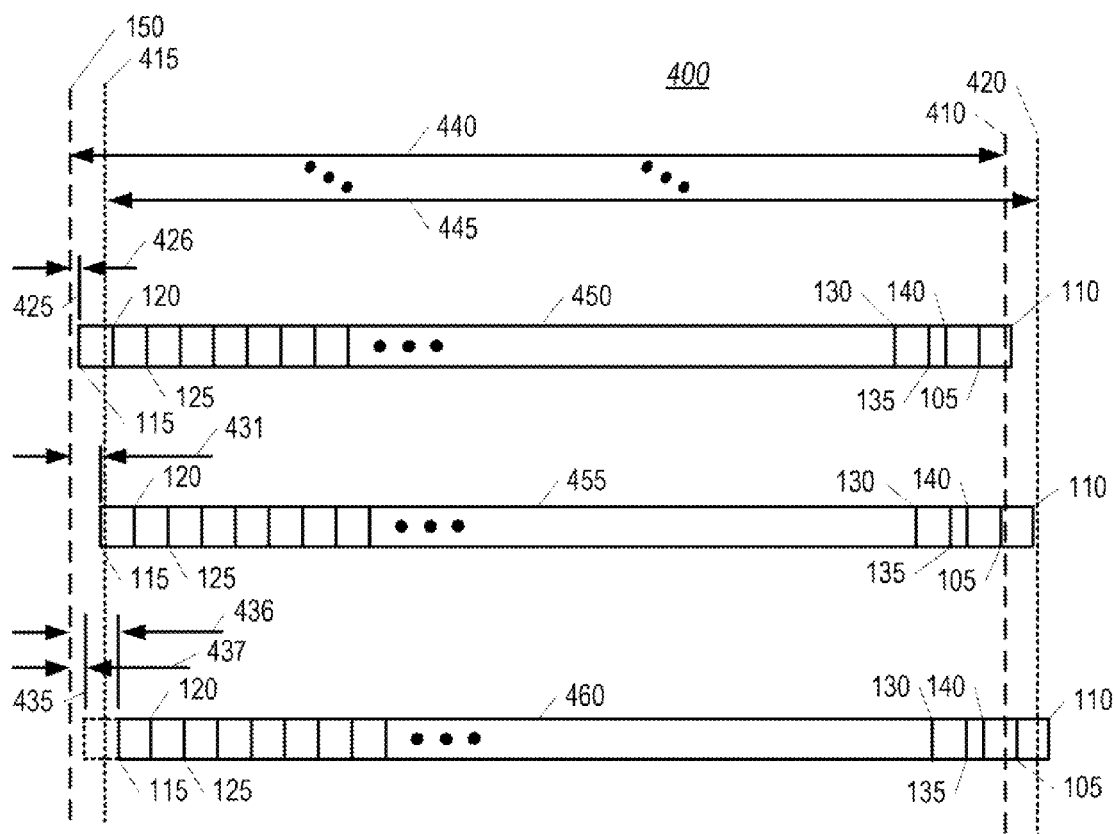
FIG. 4 shows timing diagrams that illustrate synchronizing preambles that may be transmitted by a user device when the user device attempts to communicate data to a network station, in accordance with certain embodiments.

An example of synchronizing to the user device when the user device is near 315 (FIG. 3) the nominal maximum range 330 (FIG. 3) to the network station 305 (FIG. 3) is shown by received synchronizing preamble 455, which is the same as synchronizing preamble 260 of FIG. 2, but delayed by a larger propagation delay 431 (FIG. 4). The network station communicates the propagation delay 431 as the transmission timing advance and also communication the value N to the user device, which uses the timing advance to advance the timing of transmissions that the user device makes to the network station 305 (FIG. 3).

An example of synchronizing to the user device when the user device is beyond 320 (FIG. 3) the nominal maximum range 330 (FIG. 3) to the network station 305 (FIG. 3) is shown by received synchronizing preamble 460, which is the same as synchronizing preamble 260 of FIG. 2, but delayed by an even larger propagation delay 436 (FIG. 4). In some instances, the energy of the synchronizing preamble can be sufficient to allow the network station to recover enough of the symbols with their correct value to identify a synchronizing preamble, however the synchronizing preamble is identified as starting at time 435 (FIG. 4) and being cyclically shifted by N−1 shift index durations. In this example, the synchronization process makes a determination that N=1. The energy received before the symbol at shift index 115 is processed as if it is noise, which it may be in some embodiments. In this example, when a correlation filter is used for the synchronization process, a maximum output of the filter occurs when the filter is evaluating the received symbols as if the synchronizing sequence starts at time 435. The network station communicates the transmission advance timing as the value 437, which is smaller than the propagation delay by an amount of one shift index duration, and communicates the value N−1 to the user device. The user device can detect that the value N−1 is incorrect and in accordance with certain embodiments, take corrective action.

Figure 5:
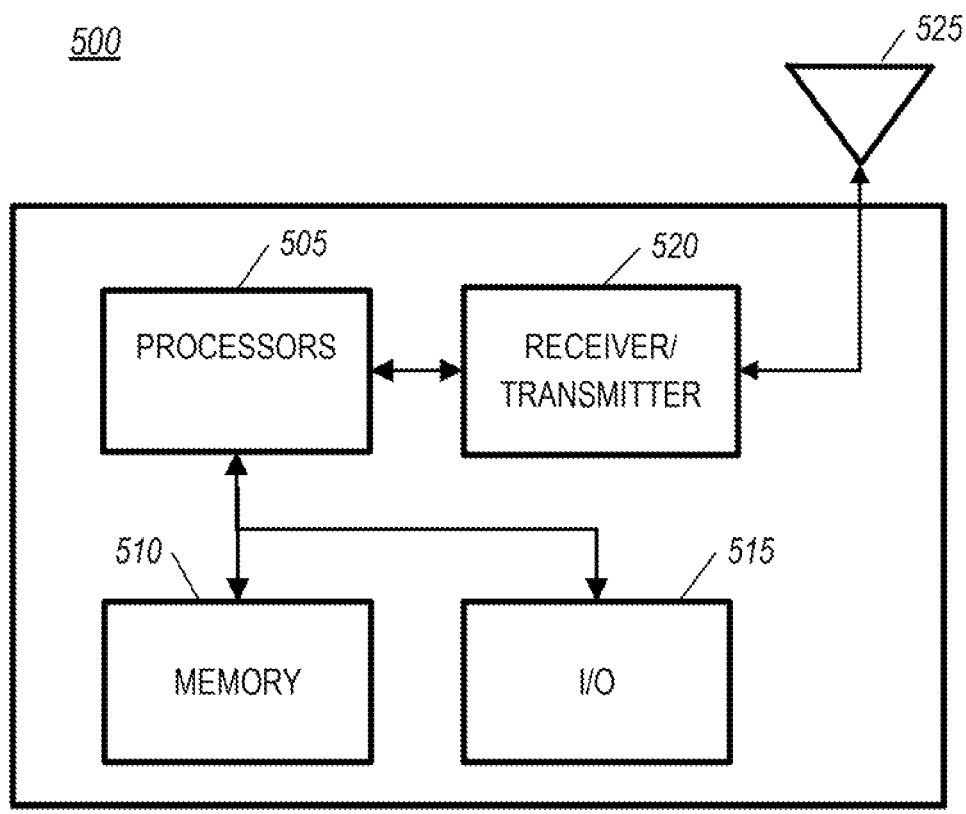
FIG. 5 is an electrical block diagram of a user device used in a communication system, in accordance with certain embodiments.

FIG. 5 is a block diagram of a user device 500 that includes a transceiver 520, in accordance with certain embodiments. The device 500 includes one or more processors 505, each of which may include such apparatuses as central processing units, cache memory, instruction decoders, and timers, just to name a few. The processors execute program instructions which could be located within memory locations that are within the processors, or may located in a memory 510 to which the processors 505 are bi-directionally coupled. The processors 505 may include input/output interface circuitry and may be coupled to input/output interface circuitry 515 that is external to the processors 505. The processors 505 are further coupled to a radio transceiver 520 which includes a radio transmit function and a radio receive function. The transceiver 520 is coupled to a radio antenna 525. In some embodiments, the processors 505 may be coupled to the transceiver 520 through the input/output function 515. The transceiver 520 may comprise one or more processors and memory, in addition to circuits that are unique to radio functionality. The user device 500 may be a personal communication device such as a cell phone, a tablet, or a personal computer, or may be any other type of radio communication device operating in a radio network. The radio network may be any type of network in which synchronizing preambles such as those described herein are used, such as cellular communication networks, other wide area networks, local networks such as Wi-Fi networks, or cable mesh networks, or military networks. In some embodiments, the device 500 is an LTE (Long Term Evolution) UE (user equipment) that operates in a 3GPP ($3^{rd}$ Generation Partnership Project) network, in which the synchronizing preamble is described at least in 3GPP TS 36.211 V10.1.0. The user device functions described herein above with reference to FIGS. 1-4 and herein below are capable of being performed in user device 500.

Figure 6:
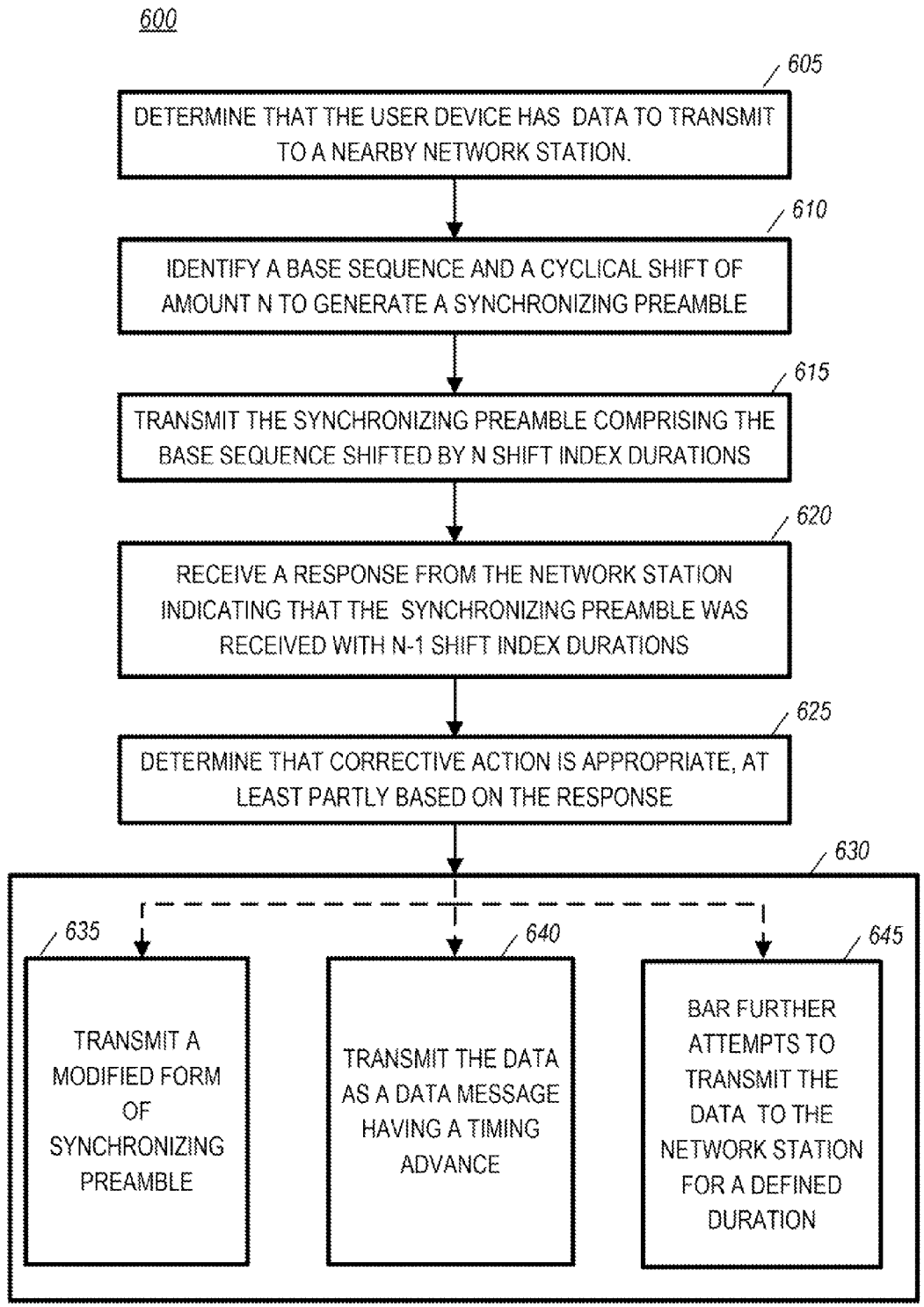

Referring to FIG. 6, a flow chart 600 describes some steps of a method used in a user device for communicating, in accordance with certain embodiments. At step 605, a determination is made by a user device that the user device has data to transmit to a nearby network station and the user device is unsynchronized with the network station. At step 610, the user device identifies a base sequence and a cyclical shift of the base sequence to use in a synchronizing preamble. For example, in a 3GPP LTE system, the user device has received from the network information that tells the user device how large each shift index duration is and what base sequence(s) to use to form the synchronizing preamble. In systems in which this information is not embedded in the user device, it is communicated to the user device using a system protocol that is different than the data protocol used to communicate the data to the network station. The system protocol is more robust (able to operate reliably), but may require more system resources (time or energy) per bit of information than the protocol to be used for the data. The data protocol includes the use of the synchronizing preamble. In the example 3GPP LTE user device described herein above, the broadcast control channel (BCCH) is used to communicate which base sequences are to be used to form the plurality of synchronizing preambles from which the user device randomly selects one. It will be appreciated that steps 605 and 610 could be performed in the reverse order. At step 615 a synchronizing preamble is transmitted with no timing advance. The synchronizing preamble comprises a base sequence that has been cyclically shifted by N shift index durations. A response to the synchronizing preamble is received at step 620 from the network station that indicates that a preamble was received from the user device having the base sequence cyclically shifted by N−1 shift index durations. At step 625, the user device makes a determination, at least partly based on the response, that corrective action is appropriate (because the user device is apparently beyond a nominal maximum range from the network station). At step 630, the user device performs a correction action comprising one of transmitting (at step 635) a modified form of synchronizing preamble, transmitting (at step 640) the data as a data message having a timing advance, and barring (at step 645) further attempts to transmit the data to the network station for a defined duration. In some embodiments the barring of further attempts in step 645 may be used when message traffic is high, as a means to optimize system throughput. In other embodiments, it may be imposed after some number of synchronizing preambles have been transmitted in an unsuccessful attempt to deliver the data. The duration may be adjustable by command from the network station, or fixed, or determined by the user device from other system parameters.

Figure 7:
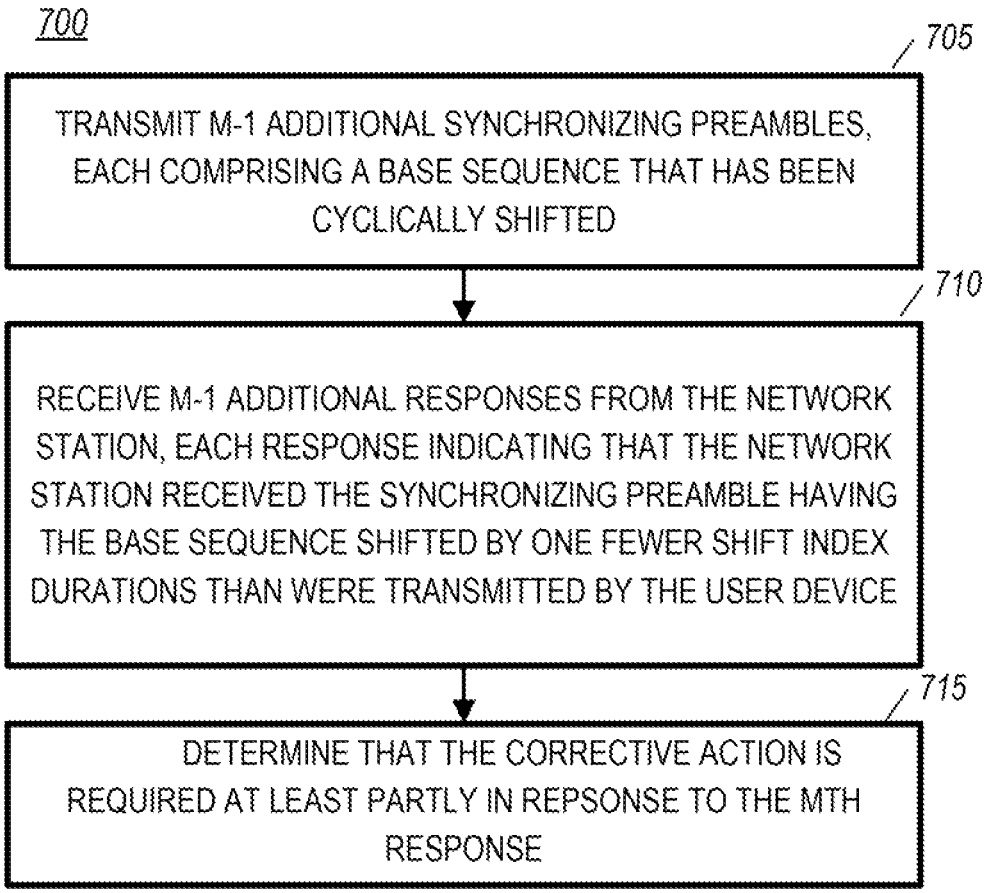

Referring to FIG. 7, a flow chart 700 describes some steps of the method used in a user device for communicating data described with reference to FIG. 6, in accordance with certain embodiments. At step 705, a quantity of M−1 additional synchronizing preambles are transmitted with no timing advances after the synchronizing preamble is transmitted in step 615 (FIG. 6) and a response received in step 620 (FIG. 6). Each of the M−1 additional synchronizing sequences comprises a base sequence that has been cyclically shifted by $N_{Mi}$ shift index durations, wherein the subscript $M_i$ identifies one of the M−1 synchronizing preambles. The values $N_{Mi}$ are not necessarily different. In some embodiments they are the same. In the 3GPP LTE example described above, they are likely to be different, but may not be because the selection is random. At step 710, M−1 additional responses are received from the network station, each corresponding to one of the M−1 additional synchronizing preambles. Each response indicates that the network station received the corresponding synchronization preamble having the base sequence shifted by one fewer shift index durations than were transmitted in the corresponding additional synchronizing preamble. In other words the network station has indicated that the corresponding base sequence received by the network station was shifted by $N_{Mi}$−1 shift index durations. The determination at step 715 is then made at least partly in response to the receipt of the $M^{th}$ response, which is the last response of the M−1 responses of step 710 and the response of step 620 (FIG. 6). In some embodiments, the determination made at step 625 without utilizing steps 705-715 provides sufficient reliability to take corrective action, whereas in other embodiments, a determination made at step 715 based on receiving an Mth response provides sufficient reliability to make a determination that corrective action is to be taken.

Figure 8:
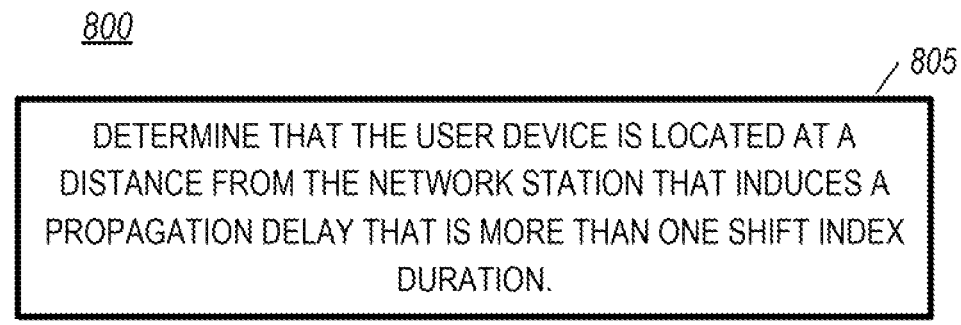

Referring to FIG. 8, a flow chart 800 describes a step of the method used in a user device for communicating data described with reference to FIG. 6, in accordance with certain embodiments. The step of flow chart 800 is used in some embodiments in addition to steps 615 and 620 of FIG. 6 to make the determination made in step 625 (FIG. 6). At step 805, a determination is made by the user device that the user device is located at a distance from the network station that induces a propagation delay that is more than one shift index duration. The determination of distance may, for example, be performed by the user device learning the geographical location or having the geographical location of the network station getting a GPS location from a GPS receiver in the user device. Another method may involve triangulation of network signals by the user device. In some embodiments, a combination of the steps described above with reference to flow chart 700 is used with the determination of distance described with reference to step 805 (i.e., both criteria must be met) to achieve sufficient reliability to determine that corrective action is to be taken.

Referring to FIG. 9, a flow chart 900 shows a step of the method used in a user device for communicating data described with reference to FIG. 6, in accordance with certain embodiments. The step of flow chart 900 is used in some embodiments to accomplish the step 635 (FIG. 6) of transmitting a modified form of synchronizing preamble. At step 905, a synchronizing preamble that has an unshifted base sequence is selected as the modified form of a synchronizing preamble that is transmitted. The unshifted base sequence is not necessarily the same sequence used in step 615 (FIG. 6). In certain 3GPP LTE systems, such as the example described herein above, it is possible that base sequence is different from the base sequence used in the synchronizing preamble of step 615. In other embodiments, the base sequence may be the same base sequence used in the synchronizing preamble of step 615. This use of a synchronizing preamble comprising a base sequence provides a lower probability of the synchronizing preamble being identified as one that is cyclically shifted by N−1 shift index durations, for which in this case N−1 would be the maximum shift index value (i.e., SI26 in the LTE example described herein). The reason for this is shown in FIG. 10, which is a timing diagram 1000 for an example wherein N=0 and the user device is in a location similar to location 320 (FIG. 3), and wherein the base sequence of the synchronizing preamble includes "left over" symbols that are located at the end of an unshifted base sequence. Reference numbers in FIG. 10 that are same as the reference numbers in FIG. 4 are the same items as in FIG. 4. Because of the "left over" symbols that would be expected to precede the SI0 duration, the propagation delay 1010 of the unshifted preamble sequence 1005 is likely to be such that the synchronizing process identifies time 1015 as the time of the start 130 of the last shift index. Time 1015 precedes the system preamble time 150. Since it is illogical that the start of a synchronizing sequence would be prior to the system sequence time, the network station determines that the synchronizing preamble actually starts at the time 1020 and comprises an unshifted base sequence. The network station can then respond to the synchronizing preamble with an indication of a synchronizing preamble having no shift and a timing advance equal to the determined propagation delay 1010.

Referring to FIG. 11, a flow chart 1100 describes steps of the method used in a user device for communicating data described with reference to FIG. 6, in accordance with certain embodiments. The steps of flow chart 1100 are used in some embodiments to accomplish the step 635 (FIG. 6) of transmitting a modified form of synchronizing preamble. At step 1105, a next synchronizing preamble is selected. The next synchronizing preamble is not necessarily different from a previous synchronizing preamble, including the case wherein the previous synchronizing preamble is the synchronizing preamble referred to in step 610 (FIG. 6). In certain 3GPP LTE systems, such as the example described herein above, it is likely but not certain that a next synchronizing preamble is different from a previous synchronizing preamble. The modified form of synchronizing preamble is generated at step 1110 by advancing the timing of the next synchronizing preamble by a duration that is equal to or greater than one shift index duration. In some embodiments, the duration is exactly one shift duration. In some embodiments the method further comprises sending another synchronizing preamble in accordance with step 615 of FIG. 6 in order to determine a new timing advance using one of the determination techniques already described herein with reference to FIGS. 6-8.

Referring to FIG. 12, a flow chart 1200 describes a step of the method used in a user device for communicating data described with reference to FIG. 6, in accordance with certain embodiments. The step of flow chart 1100 is used in some embodiments to accomplish the step 635 (FIG. 6) of transmitting a modified form of synchronizing preamble. The duration described in step 1110 is determined in step 1205 from one or more of the following factors: the indication that the synchronizing preamble was received with N−1 shift index durations, a timing advance value that is provided in a response from the network station, and a propagation delay determined by the user device based on a physical location of the user device determined by the user device.

Referring again to FIG. 12, in some embodiments, the fact that the response indicates that the synchronizing preamble was received with N−1 shift index durations is used as a sole factor to set the duration of the timing advance for the modified synchronizing preamble. The duration of the timing advance is set to be exactly one shift index duration. As noted earlier, one shift index duration has a duration of a quantity of symbols that may be selected to be approximately equivalent to a nominal range at which a particular user device can communicate with a particular network station, when using a protocol having a particular bandwidth, wherein the protocol may have been chosen based on factors such as system loading, message length, quality of service, equipment power limitations, etc. In LTE systems, the network station makes the final choice of how many shift cycles are to be obtained from a preamble of 839 symbols according to user device type and protocol type, and identifies this value to the user device, from which the user device determines the shift index duration. The modified synchronizing preamble will have a certain number, P, of shift index durations. When a response to the modified synchronizing preamble indicates that P shift index durations are received, the user device may use the timing advance received in that response to transmit the data in a data message using the timing advance.

In some embodiments, the timing advance value received in the response may be used in conjunction with the indication that the synchronizing preamble was received with N−1 shift index durations to set the duration of the timing advance for the modified synchronizing preamble. In this method, the timing advance of the modified synchronizing preamble may be set to exactly one shift index duration when the timing advance received in the response is less than one shift index delay. The modified synchronizing preamble would have a certain number, P, of shift index durations. The modified preamble is transmitted. When a response to the modified synchronizing preamble indicates that P shift index durations are received, the user device can use the timing advance received in that response to transmit the data in a data message using the timing advance. When the timing advance is greater than one shift index duration, this is considered to be an aberration and a new synchronizing preamble may be chosen as is done in step 610 (FIG. 6) and be transmitted with no timing advance as is done in step 615 (FIG. 6) and the method may proceed from step 615. The use of both the timing advance and the N−1 shift index durations received in the response marginally improves the process.

In some embodiments, a propagation delay determined by the user device based on a physical location of the user device determined by the user device is used as a factor to set the duration of the timing advance for the modified synchronizing preamble. The propagation delay determined by the user device may be used in conjunction with a timing advance and the number of shift index durations received in the response to confirm that corrective action is appropriate. For example, the number of shift index durations reported is N−1 and the timing advance received in the response plus one shift index duration is approximately equivalent to the propagation delay determined from the determined location, then the duration of the timing advance for the modified preamble can be set to one shift index duration. The confidence of this being a correct course of action is improved over using just the fact that N−1 shift index durations were reported in the response.

Referring to FIG. 13, a flow chart 1300 describes a step of the method used in a user device for communicating data described with reference to FIG. 6, in accordance with certain embodiments. The steps of flow chart 1100 are used in some embodiments to accomplish the step 640 (FIG. 6) of transmitting a data message having a timing advance. At step 1305, a timing advance of the data message is determined from one or more of: the indication that the synchronizing preamble was received with N−1 shift index durations; a timing advance value that is provided in a response from the network station, and a propagation delay determined by the user device based on a physical location of the user device determined by the user device.

The factors described for determining the timing advance for the data message are the same described for generating the next synchronizing preamble of flow chart 1100, which are listed in flow chart 1200. However, in many embodiments a data message must be transmitted with more accuracy with reference to a system message time than the accuracy required for transmitting a synchronizing preamble with reference to the system preamble time. The system message time and system preamble time, which are defined relative to real local time, may have the same definition in some systems. Therefore different use may be made of them. In some embodiments, the timing advance value that is provided in the response is added to one shift index value and that sum is used as the timing advance for the data message when the indication is received in the response that the synchronizing preamble was received with N−1 shift index durations. In some embodiments, the propagation delay determined by the user device may be used instead of the timing advance value from the response to set the timing advance of the data message. This could be done without reference to the number of shift advances received in the response, but the reliability is likely better when the propagation delay is used only when the number of shift index durations is indicated to be N−1. In some embodiments, a difference of the timing advance duration and the propagation delay determined by the user that exceeds a limit may be used to invoke the method described above with reference to FIG. 7 to be used, and the multiple timing advances of multiple responses that are received as a result may be used to refine an estimate of the timing advance to use for the data message—e.g., by averaging or other statistical techniques known to those of ordinary skill in the art.

The processes illustrated in this document, for example (but not limited to) the method steps described in FIGS. 6-9 and 11-13, may be performed using programmed instructions contained on a computer readable medium which may be read by processor of a CPU. A computer readable medium may be any tangible medium capable of storing instructions to be performed by a microprocessor. The medium may be one of or include one or more of a CD disc, DVD disc, magnetic or optical disc, tape, and silicon based removable or non-removable memory. The programming instructions may also be carried in the form of packetized or non-packetized wireline or wireless transmission signals. The steps need not all necessarily be performed in the sequence described herein, unless required by logical deduction.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method used by a user device for communicating data from the user device to a network station, comprising:
    transmitting a synchronizing preamble having no timing advance, the synchronizing preamble comprising a base sequence that has been cyclically shifted by N shift index durations, wherein N is an integer, and the base sequence comprising a plurality of cyclic shifts, each cyclic shift including a plurality of symbols, and the base sequence including one or more other symbols that are not included in the plurality of cyclic shifts;
    receiving from the network station a response that indicates that the synchronizing preamble was received from the user device having the base sequence cyclically shifted by N−1 shift index durations;
    determining, based at least partially on the response, that corrective action is appropriate; and
    performing one of:
        transmitting a modified form of synchronizing preamble
        transmitting the data as a data message having a timing advance, and
        barring further attempts to transmit the data to the network station for a defined duration.

2. The method according to claim 1, further comprising:
    transmitting M−1 additional synchronizing preambles, M being an integer greater than or equal to two, each additional synchronizing preamble comprising a base sequence that has been cyclically shifted by $N_{Mi}$ shift index durations, the base sequence of each additional synchronizing preamble being either the same as the base sequence of the synchronizing preamble or different from the base sequence of the synchronizing preamble, wherein the subscript $M_i$ identifies one of the M−1 additional synchronizing preambles; and
    receiving M−1 additional responses from the network station, each response indicating that the network station received the respective base sequence cyclically shifted by $N_{Mi}$−1 shift index durations, wherein the determination is made at least partly in response to receipt of the $M^{th}$ response from the network station.

3. The method according to claim 1, wherein the step of determining further comprises:
    making a determination by the user device that the user device is located at a distance from the network station that induces a propagation delay that is more than one shift index duration.

4. The method according to claim 1, wherein transmitting the modified form of synchronizing preamble further comprises:
    selecting as the modified form of synchronizing preamble a synchronizing preamble that has an unshifted base sequence.

5. The method according to claim 1, wherein transmitting the modified form of synchronizing preamble further comprises:
    selecting a next synchronizing preamble, wherein the next synchronizing preamble is not necessarily different from a previous synchronizing preamble;
    generating the modified form of synchronizing preamble by advancing a timing of the next synchronizing preamble by a duration that is equal to or greater than one shift index duration.

6. The method according to claim 5, wherein the duration is determined from one or more of:
    an indication that the synchronizing preamble was received with the N−1 shift index durations;
    a timing advance value that is provided in the response from the network station, and
    a propagation delay determined by the user device based on a physical location of the user device determined by the user device.

7. The method according to claim 5, wherein transmitting the modified form of synchronizing preamble further comprises:
    advancing a timing of the next synchronizing preamble by a duration that is equal to one shift index duration; and
    transmitting the next synchronization preamble.

8. The method according to claim 1, wherein the timing advance of the data message is determined from one or more of:
    an indication that the synchronizing preamble was received with the N−1 shift index durations;
    a timing advance value that is provided in the response from the network station, and a propagation delay determined by the user device based on a physical location of the user device determined by the user device.

9. The method according to claim 8, wherein the timing advance used for the data message is a sum of one shift index duration and the timing advance value that is provided in a response from the network station.

10. The method according to claim 1, wherein the user device is an apparatus that is capable of communicating in a 3$^{rd}$ Generation Partnership Project, Long-Term Evolution (3GPP LTE) communication system.

11. A user device that is capable of communicating data from the user device to a network station, comprising:
 a transmitter that transmits a synchronizing preamble having no timing advance, the synchronizing preamble comprising a base sequence that has been cyclically shifted by N shift index durations, wherein N is an integer, and the base sequence comprising a plurality of cyclic shifts, each cyclic shift including a plurality of symbols, and the base sequence including one or more other symbols that are not included in the plurality of cyclic shifts;
 a receiver that receives from the network station a response that indicates that the synchronizing preamble was received from the user device having the base sequence cyclically shifted by N−1 shift index durations; and
 a processor that determines, based at least partially on the response, that corrective action is appropriate; and
 performs one of:
  transmitting a modified form of synchronizing preamble
  transmitting the data as a data message having a timing advance, and
  barring further attempts to transmit the data to the network station for a defined duration.

12. The user device according to claim 11:
 wherein the transmitter transmits M−1 additional synchronizing preambles, M being an integer greater than or equal to two, each additional synchronizing preamble comprising a base sequence that has been cyclically shifted by N$_{Mi}$ shift index durations, the base sequence of each additional synchronizing preamble being either the same as the base sequence of the synchronizing preamble or different from the base sequence of the synchronizing preamble, wherein the subscript M$_i$ identifies one of the M−1 additional synchronizing preambles; and
 the receiver receives M−1 additional responses from the network station, each response indicating that the network station received the respective base sequence cyclically shifted by N$_{Mi}$−1 shift index durations, wherein the determination is made at least partly in response to receipt of the M$^{th}$ response from the network station.

13. The user device according to claim 11, wherein in the step of determining, the processor makes a determination by the user device that the user device is located at a distance from the network station that induces a propagation delay that is more than one shift index duration.

14. The user device according to claim 11, wherein the processor, when transmitting the modified form of synchronizing preamble, selects as the modified form of synchronizing preamble a synchronizing preamble that has an unshifted base sequence.

15. The user device according to claim 11, wherein the timing advance of the data message is determined by the processor from one or more of:
 an indication that the synchronizing preamble was received with the N−1 shift index durations;
 a timing advance value that is provided in the response from the network station, and
 a propagation delay determined by the user device based on a physical location of the user device determined by the user device.

16. A non-transitory computer-readable medium comprising programmed instructions that, when executed by a processor of a user device, communicate data from the user device to a network station, by:
 transmitting a synchronizing preamble having no timing advance, the synchronizing preamble comprising a base sequence that has been cyclically shifted by N shift index durations, wherein N is an integer, and the base sequence comprising a plurality of cyclic shifts, each cyclic shift including a plurality of symbols, and the base sequence including one or more other symbols that are not included in the plurality of cyclic shifts;
 receiving from the network station a response, wherein the response indicates that the synchronizing preamble was received from the user device having the base sequence cyclically shifted by N−1 shift index durations;
 determine, based at least partially on the response, that corrective action is appropriate; and
 performing one of:
  transmitting a modified form of synchronizing preamble
  transmitting the data as a data message having a timing advance, and
  barring further attempts to transmit the data to the network station for a defined duration.

17. The medium according to claim 16, wherein communicating the data from the user device to the network station further comprises instructions for:
 transmitting M−1 additional synchronizing preambles, M being an integer greater than or equal to 2, each additional synchronizing preamble comprising a base sequence that has been cyclically shifted by N$_{Mi}$ shift index durations, the base sequence of each additional synchronizing preamble being either the same as the base sequence of the synchronizing preamble or different from the base sequence of the synchronizing preamble, wherein the subscript M$_i$ identifies one of the M−1 additional synchronizing preambles; and
 receiving M−1 additional responses from the network station, each response indicating that the network station received the respective base sequence cyclically shifted by N$_{Mi}$−1 shift index durations, wherein the determination is made at least partly in response to the receipt of the M$^{th}$ response from the network station.

18. The medium according to claim 16, wherein the determining further comprises instructions for:
 making a determination by the user device that the user device is located at a distance from the network station that induces a propagation delay that is more than one shift index duration.

19. The medium according to claim 16, wherein transmitting the modified form of synchronizing preamble further comprises instructions for:
 selecting as the modified form of synchronizing preamble a synchronizing preamble that has an unshifted base sequence.

20. The medium according to claim 16, further comprising instructions that determine the timing advance of the data message from one or more of:
 an indication that the synchronizing preamble was received with the N−1 shift index durations;

a timing advance value that is provided in the response from the network station, and a propagation delay determined by the user device based on a physical location of the user device determined by the user device.

* * * * *